United States Patent

Myllymäki et al.

[11] Patent Number: 6,018,646
[45] Date of Patent: Jan. 25, 2000

[54] POWER CONSUMPTION MONITOR AND ALARM FOR A MOBILE MEANS OF COMMUNICATION

[75] Inventors: Kimmo Sakari Myllymäki, Riippakoivuntie; Veli A. Santomaa, Kotitontuntie; Seppo Kalervo Kivelä, Rinteentie, all of Finland

[73] Assignee: Nokia Mobile Phones Limited, Espoo, Finland

[21] Appl. No.: 08/916,832

[22] Filed: Aug. 22, 1997

[30] Foreign Application Priority Data

Aug. 30, 1996 [FI] Finland ...................................... 963389

[51] Int. Cl.$^7$ .................................................. H04B 17/00
[52] U.S. Cl. ........................ 455/115; 455/423; 455/67.1; 455/116; 455/117
[58] Field of Search ............................. 455/226.1, 226.2, 455/226.4, 234.2, 250.1, 115, 117, 126, 127, 67.1, 69, 70, 129, 423

[56] References Cited

U.S. PATENT DOCUMENTS

| | | | |
|---|---|---|---|
| 4,593,409 | 6/1986 | Miller | 455/129 |
| 4,703,259 | 10/1987 | Berliner et al. | 455/115 |
| 5,091,919 | 2/1992 | Kuisma | 375/60 |
| 5,101,175 | 3/1992 | Vaisanen | 330/279 |
| 5,109,538 | 4/1992 | Ikonen et al. | 455/89 |
| 5,118,965 | 6/1992 | Vaisanen et al. | 307/261 |
| 5,123,031 | 6/1992 | Kuisma | 375/60 |
| 5,152,004 | 9/1992 | Vaisanen et al. | 455/68 |
| 5,204,643 | 4/1993 | Verronen | 333/81 R |
| 5,214,372 | 5/1993 | Vaisanen et al. | 324/95 |
| 5,230,091 | 7/1993 | Vaisanen | 455/88 |
| 5,241,694 | 8/1993 | Vaisanen et al. | 455/126 |
| 5,276,917 | 1/1994 | Vanhanen et al. | 455/89 |
| 5,291,150 | 3/1994 | Saarnimo et al. | 330/279 |
| 5,313,661 | 5/1994 | Malmi et al. | 455/232.1 |
| 5,333,175 | 7/1994 | Ariyavisitakul et al. | 455/423 |
| 5,392,464 | 2/1995 | Pakonen | 455/115 |
| 5,404,585 | 4/1995 | Vimpari et al. | 455/115 |
| 5,432,473 | 7/1995 | Mattila et al. | 330/133 |
| 5,434,537 | 7/1995 | Kukkonen | 330/2 |
| 5,450,620 | 9/1995 | Vaisanen | 455/127 |
| 5,493,255 | 2/1996 | Murtojarvi | 330/296 |
| 5,530,923 | 6/1996 | Heinonen et al. | 455/126 |
| 5,548,616 | 8/1996 | Mucke et al. | 375/295 |
| 5,564,074 | 10/1996 | Juntti | 455/67.1 |
| 5,564,084 | 10/1996 | Hirasawa | 455/115 |
| 5,564,086 | 10/1996 | Cygan et al. | 455/126 |
| 5,590,415 | 12/1996 | Peltola et al. | 455/115 |
| 5,604,921 | 2/1997 | Alanara | 455/45 |
| 5,943,609 | 8/1999 | Ericson et al. | 455/67.4 |

FOREIGN PATENT DOCUMENTS

| | | |
|---|---|---|
| 92766 | 12/1994 | Finland . |
| 2277234 | 10/1994 | United Kingdom . |
| PCT/SE95/00174 | 9/1995 | WIPO ...................................... 455/561 |
| WO 95/24059 | 9/1995 | WIPO . |

OTHER PUBLICATIONS

Patent Abstracts of Japan, Publication No. 08029462 A, Yoshimura Koji, "Reflected Wave Monitoring Device".

*Primary Examiner*—Dwayne D. Bost
*Assistant Examiner*—Joy Redmon
*Attorney, Agent, or Firm*—Perman & Green, LLP

[57] ABSTRACT

The invention relates to portable mobile communication device. The system according to the invention measures the power transmitted by the mobile communication device and the reflected power returning from the antenna. From these, the system calculates various parameters, for example, the short-term average value, the cumulative sum of transmitted power used during a call and the proportion of power reflected back. The user may set the limit values which he requires for these parameters, and the system will issue an alarm when these are exceeded. If the user so desires, the system may also continuously display the value of a desired quantity. With the aid of the system according to this invention, the user may monitor the benefit of different positions and ways in which the appliance is used and the power consumption of the mobile communication device in different situations, and thus avoid unfavorable operating situations and methods.

4 Claims, 2 Drawing Sheets

POWER CONSUMPTION MONITOR AND ALARM FOR A MOBILE MEANS OF COMMUNICATION

BACKGROUND OF THE INVENTION

This invention relates to mobile means of communication, and in particular to the ways and situations in which they are used.

In the most common mobile communication means systems, the base station controls the transmitted power of the mobile communication means on the basis of the received signal level. The transmitted power of a mobile communication means close to the base station is small, whereas at the limits of the coverage area the transmitted power is at its maximum. The current consumption of a mobile communication means is thus highly dependent upon the place in which the device is used.

Different obstacles, particularly in the immediate vicinity of the antenna, also attenuate the transmitter signal. The base station compensates for this attenuation by increasing the transmitted power of the mobile communication means. For example, a poor operating position of the mobile communication means, or having the antenna too close to the user's head, may cause an unnecessary rise in the current consumption. The same problem also arises when the user has turned so that his head lies between the base station and the mobile communication means.

A third factor affecting the intensity of the signal received by the base station is the position of the antenna of the mobile communication means. The base station antennae are typically arranged so as to transmit and receive vertically polarized signals, in which case the signal received by the base station is at its most powerful when the antenna of the mobile communication means is in the vertical position. If the user holds the mobile communication means diagonally or even horizontally, the signal received by the base station is thereby weakened, in which case the base station has again to increase the transmitted power.

An object of this invention is to create a system which directs the user of a mobile communication means to use his device in an optimal way. An object of this invention is also to create a system with the aid of which the user may avoid or shorten the length of a call when the power consumption of the mobile communication means is high. A further object of the invention is to create a system with the aid of which the user may maximize the battery charging interval. An object of the invention is also to create such a system with as little alteration as possible to current mobile telephones.

SUMMARY OF THE INVENTION

The objects of the invention are attained by monitoring the power fed to the antenna and the reflected power returning from the antenna, and by informing the user of these in the way desired by the user. The amount of power fed to the antenna immediately reveals the level of current consumption by the mobile communication means. Objects close to the antenna cause reflection of power back, in which case a high level of reflected power indicates that the antenna is, for example, too close to the user's head.

This invention is characterized by the fact that it comprises a detector of power fed to the antenna, a detector of reflected power returning from the antenna, a control device, at least one alarm device and by the fact that the system is designed to monitor reflected radio power returning from the mobile communication means antadio power fed to the mobile communication means antenna, and reflected radio power returning from the mobile communication means antenna, and by the fact that the system is designed to alarm the user of the mobile communication means of a manner of usage in which the radio power consumption of the mobile communication means exceeds a preset limit.

The system according to this invention measures the power transmitted by the mobile communication means and the reflected power returning from the antenna as a function of time. From these the system calculates different parameters, for example the short-term average value, the cumulative sum of transmitted power used during a call and the ratio of transmitted to reflected power. The user may determine his desired limit values for these, and when these limit values are exceeded the system will issue an alarm concerning this. If the user so desires, the system may also continuously indicate the value of a desired quantity. With the aid of the system according to this invention, the user may monitor the suitability of different positions and modes of use and the power consumption of the mobile communication means in different situations, and thus avoid unfavourable situations and modes of use.

DESCRIPTION OF THE DRAWING

Below, the invention will be described in greater detail with reference to favourable embodiments, which are presented by way of example, and to the attached drawings, where.

In the drawings, the same reference numbers and symbols are used for parts which correspond to one another.

DETAILED DESCRIPTION OF THE INVENTION

Figure 1:
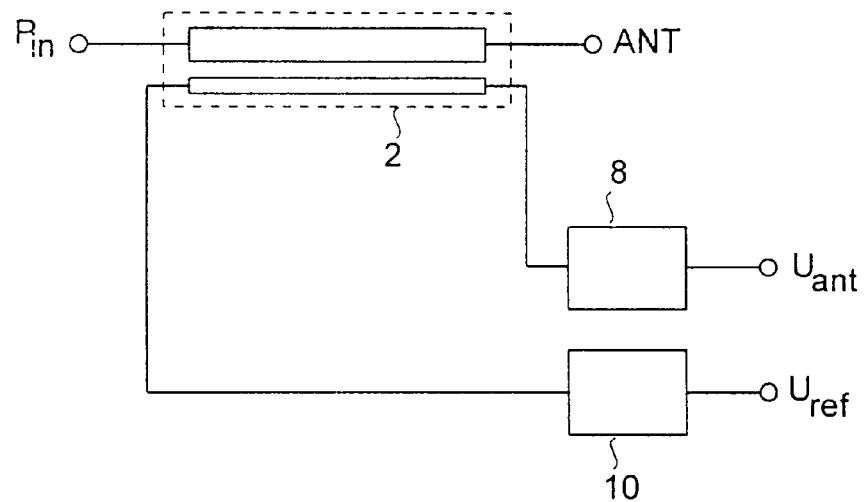
FIG. 1 shows a system according to the prior art for measuring the power fed to an antenna and the reflected power returning therefrom.
Figure 2:
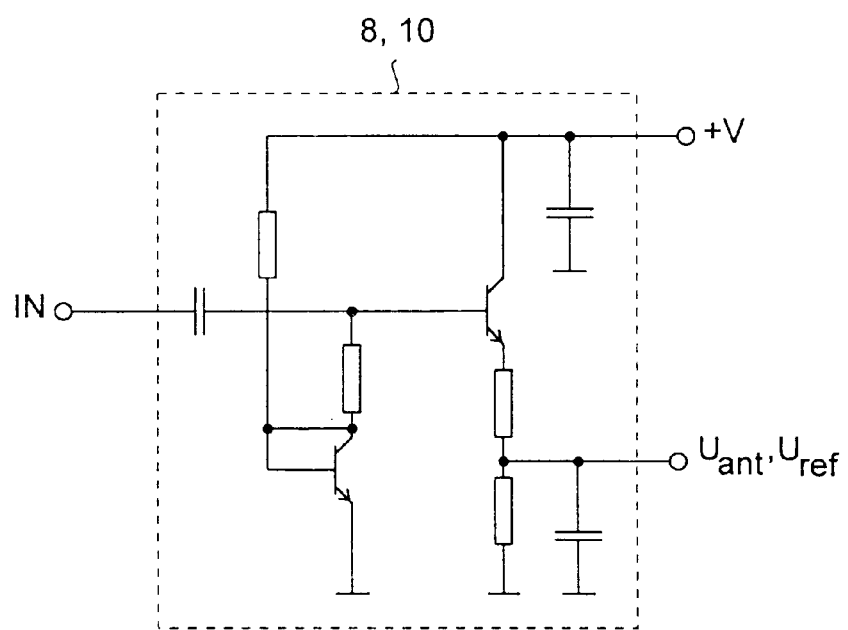
FIG. 2 shows the circuitry of a detector according to the prior art for power coming from a directional coupler.

FIG. 1 shows a system according to the prior art for measurement of the outgoing and reflected power, which may advantageously also be used in the system according to this invention. The directional coupler 2 is situated in the transmission line between the output stage of the transmitter and the antenna. The directional coupler comprises, in addition to the transmission line connectors, two outputs, the signal level of the first of which is proportional to the signal power going to the antenna from the output stage, and the signal level of the second of which is proportional to the signal power going from the antenna to the output stage. These outputs are connected to detectors 8, 10 at the outputs of which there is a DC voltage $U_{ant}$ proportional to the power going to the antenna and a DC voltage $U_{ref}$ proportional to the power going to the output stage. FIG. 2 shows the circuitry of a detector 8, 10 according to the prior art which is suitable for the system according to this invention. The operation of this detector is described in greater detail in the Finnish Patent 82865 and in the corresponding U.S. Pat. No. 5,214,372. In the system according to the present invention use may also be made of any other measuring- and detection circuitry according to the prior art.

In mobile means of communication according to the prior art it is typically only the transmitted power which is measured for regulation of the power output, in which case detector 10 in the measuring circuit according to FIG. 1 is usually replaced by a resistor. In the system according to the present invention it is essentially the power in both directions which is measured.

Figure 3:
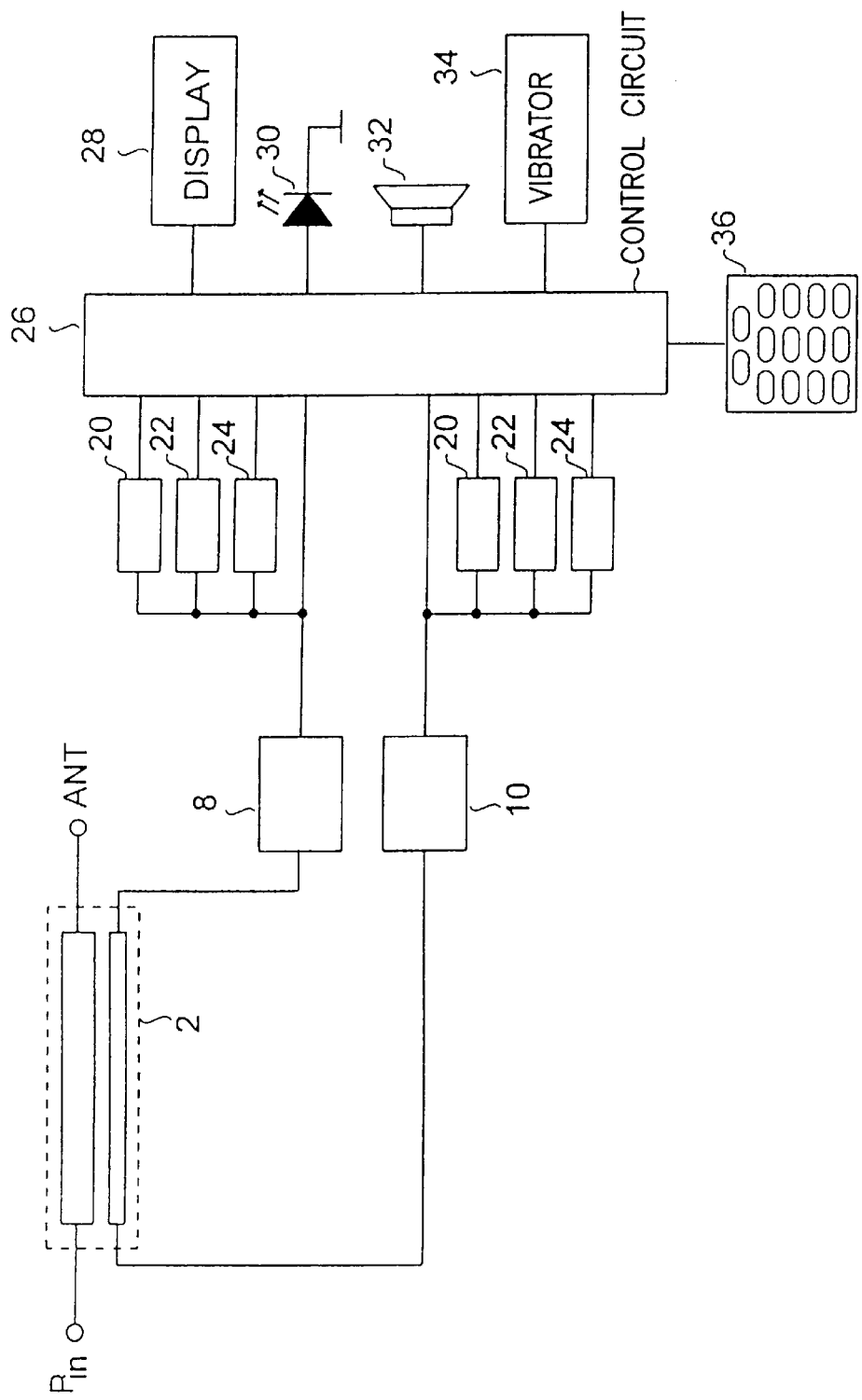
FIG. 3 shows an example of a system according to the present invention.

FIG. 3 shows one embodiment of the system according to the present invention. The outputs of the detectors 8, 10 in the system according to this invention are connected to a control circuit 26, which may for convenience be the microprocessor 26 controlling the operation of the mobile communication means. The system may also include signal processing devices, which calculate various parameters on the basis of the output signals of the detectors, such as, for example, the short-term average value, the cumulative sum of transmitted power used during a call and the ratio of transmitted to reflected power. These signal processing devices may conveniently be realized as programmes of the control circuit 26. The control circuit 26 monitors the transmitted and the reflected power and the parameters calculated from these by the signal processing devices 20, 22, 24. Control circuit 26 may transmit to the user information as to the values of these quantities or as to whether the set limits are exceeded, for example with the aid of the display 28, a light-emitting diode 30, a loudspeaker or similar device 32 or a vibrator 34. The user may set the limits he requires for different quantities, for example with the aid of the keypad 36 of the mobile communication means.

In another favourable embodiment of this invention the signal processing devices 20, 22, 24 are realized programmatically as a programme of the microprocessor 26. In that case, the output signal of detectors 8, 10 has to be converted to digital form with an analog/digital converter, after which the processor 26 may carry out the necessary signal processing operations.

The system according to this invention may transmit information as to the value of the quantities and as to whether limits are exceeded, for example by a visual signal, an acoustic signal or a mechanical signal. The visual signal may for example take the form of a light-emitting diode 30 or a symbol shown on the display 28 of the mobile communication means, which the system illuminates when a specific limit is exceeded.

With the aid of the display 28 it is possible to produce a wide selection of different indications; the indicator may for example be a symbol, text or the numerical value of a particular quantity.

With the mobile communication means loudspeaker 32, earpiece 32 or corresponding device it is possible to create various acoustic signals. When the limit value of a given quantity is exceeded, the system may issue an acoustic signal, or the value of a desired quantity may be transmitted to the user as a quiet acoustic signal, the frequency of which is dependent upon the value of the quantity. Such a signal should ideally be so quiet that it does not disturb the user's call, in which case the user may, by monitoring the pitch of the signal tone during the call, find a more favourable call location or a better operating position. The vibratory alarm of the mobile communication means may also act as the alarming device in the system according to this invention.

With the system according to this invention it is possible to monitor a wide selection of quantities in addition to directly measured transmitted and reflected power.

The short-term average value is in many cases a quantity more useful than the measured instantaneous power, since rapid changes in power caused by momentary variations in signal strength occurring, for example, when the user is moving, do not in that case immediately result in an alarm. Another useful monitored quantity is the cumulative sum of power used during a call, with the aid of which the user may set for each call the the upper limit of used power which he desires. In this way the user may be warned of situations in which the battery of the mobile communication means discharges rapidly.

In many situations, the ratio of transmitted to reflected power is a quantity more useful than reflected power alone, since the amount of transmitted power directly affects the reflected power. The power ratio best describes the condition of the antenna and the effect of objects close to the antenna on the signal. As the proportion of reflected power increases, the system may issue an alarm indicating that an object is too close to the antenna.

The quantity of reflected power alone is a useful monitored quantity if the user desires to reduce to a minimum the SAR value or the quantity of radio-frequency radiation directed at his body, as the amount of power reflected from the body is dependent upon the same factors as the quantity of radiation directed at the body: the transmitted power and the distance of the antenna from the body. For monitoring of the quantity of radio-frequency radiation directed at the body, the system may also incorporate a proximity sensor to measure the distance between the mobile communication means antenna and the body of the user. In a favourable embodiment of the invention the system may automatically reduce the outgoing power or interrupt transmission, if the quantity of reflected power exceeds a desired limit value, in which case the user does not need to monitor the system's indications.

A third useful calculated quantity is the peak value of power or of some other above-mentioned quantity which has occurred during a specific period of time, since with the customary models of mobile communication means the user does not look at the display of the mobile communication means during a call. With the aid of such a peak value quantity the user may however monitor power peaks occurring during a call.

In the system according to this invention, the user may adjust the alarming limits and types of alarm in various ways advantageously with the aid of the keypad 36 and display 28 of the mobile communication means. The user may select the quantities which he desires, set the alarming limits which he desires and choose the type of alarm which he requires. For example, the user may choose to have the short-term average value of transmitted power continuously visible on the display of the mobile communication means, and set an alarming limit on reflected power, and choose the type of alarm as a quiet acoustic signal which does not disturb his call. The user may also, if he so desires, prevent the issuing of all alarms.

With the aid of the system according to the invention, the user may control the power consumption of the mobile communication means. This is particularly useful in circumstances in which the user does not have the opportunity to recharge the batteries of the mobile communication means, in which case the user will want to retain the battery capacity for as long as possible. In an optimal situation, in a good receiving area, the current consumption is at its lowest while the quality of the link is at its best. The system according to this invention also detects faults occurring in the antenna, since deficiency in the antenna increases the ratio of reflected power to outgoing power. With the aid of the system according to the invention the user may also reduce to a minimum the SAR value and the quantity of radiation directed at his head or body by employing the correct appliance positions and situations and by adjusting the transmission time.

The system according to this invention is easy to incorporate in current mobile communication means, since for implementation of the invention use may be made of a directional coupler and transmitted power detector which are usually already present in current mobile communication means, so that only a detector of reflected power needs to be added to the mobile communication means. In a typical mobile communication means there are also a keypad and a display, which means that the control functions of the system according to this invention may be performed programmmatically making use of the microprocessor of the mobile communication means.

We claim:

1. A system for monitoring the consumption of power in a mobile communications device during use, wherein said device comprises a transmitter, a receiver, and an antenna connected thereto, said device controlled by a microprocessor, said system comprising:

a first monitor for sensing the power level of the signal from the transmitter to the antenna during use;

a second monitor for sensing the power level of the signal from the antenna to the receiver during use;

a processing module within the microprocessor constructed to receive the transmitted signal power level and the received signal power level and calculate an average value of power consumption over a selected time;

a storage module within the microprocessor for receiving and storing preset limits for said average power consumption; and wherein said processing module compares said actual power consumption to said preset limit and generates an indication to the user of the mobile communications device when said average power consumption exceeds said limits, to allow the user to adjust the use of the communication device to lower power consumption.

2. A system for monitoring the consumption of power in a mobile communications device during use, wherein said device comprises a transmitter, a receiver, and an antenna connected thereto, said device controlled by a microprocessor, said system, as described in claim 1, further comprising an input device which enables the user to enter said preset limits in accordance with personal preference.

3. A system for monitoring the consumption of power in a mobile communications device during use, wherein said device comprises a transmitter, a receiver, and an antenna connected thereto, said device controlled by a microprocessor, said system, as described in claim 1, wherein the processing module is constructed to calculate the cumulative sum of the power consumption during a call.

4. A system for monitoring the consumption of power in a mobile communications device during use, wherein said device comprises a transmitter, a receiver, and an antenna connected thereto, said device controlled by a microprocessor, said system, as described in claim 1, wherein the processing module generates a continuous indication of power consumption during use of the communications device.

* * * * *